United States Patent
Carrasco (10) Patent No.: US 10,033,246 B2
(45) Date of Patent: Jul. 24, 2018

(54) MODULAR ASSEMBLY OF MOTOR AND MAGNETIC BEARINGS, AND METHOD TO MANUFACTURE SUCH AN ASSEMBLY

(71) Applicant: Eduardo Carrasco, Saint Etienne sous Bailleul (FR)

(72) Inventor: Eduardo Carrasco, Saint Etienne sous Bailleul (FR)

(73) Assignee: SKF MAGNETIC MECHATRONICS, Rue des Champs, Saint-Marcel (FR)

( * ) Notice: Subject to any disclaimer, the term of this patent is extended or adjusted under 35 U.S.C. 154(b) by 603 days.

(21) Appl. No.: 14/627,017

(22) Filed: Feb. 20, 2015

(65) Prior Publication Data
US 2015/0244239 A1    Aug. 27, 2015

(30) Foreign Application Priority Data
Feb. 21, 2014    (FR) ...................................... 14 51396

(51) Int. Cl.
*H02K 7/09*    (2006.01)
*H02K 5/20*    (2006.01)
(Continued)

(52) U.S. Cl.
CPC ............. *H02K 7/09* (2013.01); *F16C 32/047* (2013.01); *H02K 5/20* (2013.01); *H02K 7/003* (2013.01); *H02K 7/14* (2013.01); *H02K 9/19* (2013.01); *H02K 15/00* (2013.01); *F16C 32/0489* (2013.01); *F16C 2360/44* (2013.01); *F16C 2380/26* (2013.01); *H02K 2213/12* (2013.01); *Y10T 29/49012* (2015.01)

(58) Field of Classification Search
CPC .. H02K 5/20; H02K 7/09; H02K 9/19; H02K 15/00; H02K 7/003; H02K 7/14; F16C 32/047
USPC ............. 310/52, 54, 55, 62, 63, 90.5, 90, 91
See application file for complete search history.

(56) References Cited

U.S. PATENT DOCUMENTS 2,885,963 A * 5/1959 Ivanoff ............... F04D 13/0653
                                                    310/63
4,180,946 A * 1/1980 Heijkenskjold .......... B23Q 5/10
                                                    310/90.5
(Continued)

FOREIGN PATENT DOCUMENTS

EP    1808609 A1    7/2007
FR    2768470 A2    3/1993
(Continued)

*Primary Examiner* — Naishadh Desai
(74) *Attorney, Agent, or Firm* — Bryan Peckjian; SKF USA Inc. Patent Dept.

(57) ABSTRACT

A modular motor and magnetic bearing assembly comprising a positioning casing having a plane reference surface, an outer cylindrical reference surface, a central portion provided on an outer face with cooling liquid flow channels, and intermediate portions provided with openings for gaseous fluid entry and exit; a rotor presenting an inner cylindrical reference surface and a plane reference surface; an electric motor; radial magnetic bearings; an axial abutment; and auxiliary mechanical bearings. The modular assembly can then be incorporated in a main casing simply by sliding and it can be connected directly to a functional unit without reworking adjustments of the magnetic bearings.

9 Claims, 5 Drawing Sheets (51) Int. Cl.
  *H02K 7/00*   (2006.01)
  *H02K 7/14*   (2006.01)
  *H02K 9/19*   (2006.01)
  *H02K 15/00*  (2006.01)
  *F16C 32/04*  (2006.01)

(56) References Cited

U.S. PATENT DOCUMENTS

| | | | | |
|---|---|---|---|---|
| 4,523,896 | A | * | 6/1985 | Lhenry ................. F04D 29/058 310/90.5 |
| 4,948,348 | A | | 8/1990 | Doll et al. |
| 5,469,007 | A | * | 11/1995 | Toyama .............. F16C 32/0444 310/68 B |
| 5,628,191 | A | * | 5/1997 | Kueck ....................... F02C 1/00 60/655 |
| 5,679,992 | A | * | 10/1997 | Miyamoto ........... F04D 19/048 310/90 |
| 6,579,078 | B2 | * | 6/2003 | Hill ....................... F04D 17/122 417/228 |
| 2007/0164627 | A1 | * | 7/2007 | Brunet ................ F16C 32/0459 310/90.5 |

FOREIGN PATENT DOCUMENTS

| | | | | |
|---|---|---|---|---|
| FR | 1015770 | B1 | | 12/2002 |
| JP | 06090545 | A | * | 3/1994 ............ F16C 32/047 |
| WO | 03021748 | A1 | | 3/2003 |

* cited by examiner

MODULAR ASSEMBLY OF MOTOR AND MAGNETIC BEARINGS, AND METHOD TO MANUFACTURE SUCH AN ASSEMBLY

CROSS REFERENCE TO RELATED APPLICATIONS

This is a Non-Provisional Patent Application, filed under the Paris Convention, claims the benefit of French Patent Application Number 1451396 filed on 21 Feb. 2014 (Feb. 21, 2014), which is incorporated herein by reference in its entirety.

FIELD OF THE INVENTION

The present invention relates to a modular motor and magnetic bearing assembly and to a method of manufacturing it, and it also relates to an application to rotary machines, such as centrifugal compressors, immersed rotor rotary pumps, turbogenerator units, or the like.

PRIOR ART

An immersed rotor rotary pump is known in particular from Document EP 1 015 770 B1, which pump comprises a pump wheel secured to a rotor that is driven by an electric motor and that is supported relative to a casing by means of magnetic bearings. In that type of machine, the number of mechanical parts for assembling together is large, thereby making it complex to adjust and leading to high cost.

More particularly, the elements making up such a pump are assembled together individually for the motor and for each of the magnetic bearings, and it is often necessary to disassemble and reassemble certain elements when adjusting parts, and in particular parts associated with the rotor, because dimensions need to be adjusted to match values that are very accurate in order to define the required airgaps, which must neither be too large for reasons of efficiency, nor too small in order to avoid contacts between the rotor and the stator. Assembling that type of machine thus requires multiple reference surfaces to be defined, so that each magnetic bearing and the rotor can be positioned correctly.

OBJECT AND BRIEF SUMMARY OF THE INVENTION

An object of the present invention is to remedy the above-mentioned drawbacks, and in particular to facilitate the assembly of rotary machines provided with an electric motor and magnetic bearings.

The invention also seeks to enable a user personally to incorporate an assembly made up of an electric motor and support elements constituted by magnetic bearings in a casing together with functional elements such as pump impellers.

The invention seeks in particular to simplify the making of a rotary machine that is fitted with an electric motor having magnetic bearings, and consequently to reduce the cost of fabricating it.

According to the invention, these objects are achieved by a modular motor and magnetic bearing assembly characterized in that it comprises: a positioning casing comprising a first end portion presenting a plane reference surface perpendicular to a longitudinal axis X-X', a second end portion forming the support of an axial magnetic abutment, a cylindrical wall presenting a first end having an outer cylindrical reference surface, a second end secured to the second end portion, a central portion provided on an outer face with channels for a flow of cooling liquid, a first intermediate portion provided with openings for entry of gaseous fluid, and a second intermediate portion provided with openings for exit of gaseous fluid; a rotor having the longitudinal axis X-X' as its axis and presenting a first end provided with an inner cylindrical reference surface and a plane reference surface perpendicular to the longitudinal axis X-X'; an electric motor comprising a stator mounted on an inner face of the central portion of the cylindrical wall of the positioning casing and an armature mounted on an outer surface of the rotor; a first radial magnetic bearing comprising a stator mounted on an inner face of the first intermediate portion of the cylindrical wall of the positioning casing and an armature mounted on an outer surface of the rotor; a second radial magnetic bearing comprising a stator mounted on an inner face of the second intermediate portion of the cylindrical wall of the positioning casing and an armature mounted on an outer surface of the rotor; an axial abutment comprising a rotor armature mounted at the second end of the rotor perpendicularly to the longitudinal axis X-X' and two stator subassemblies mounted on the axial abutment support; a first auxiliary mechanical bearing arranged between the first end portion of the positioning casing and the first end of the rotor; and a second auxiliary mechanical bearing arranged between the second end portion of the positioning casing and the second end of the rotor.

The modular assembly of the invention further comprises first and second position detectors for detecting the axial and radial positions of the rotor relative to the positioning casing, which position detectors are arranged respectively in the vicinity of the first radial magnetic bearing and in the vicinity of the second radial magnetic bearing.

According to an aspect of the invention, the central portion of the cylindrical wall of the positioning casing further comprises gasket housings at first and second ends of its outer face with the cooling liquid flow channels between them.

The invention also provides a rotary machine comprising: a modular assembly as defined above; a main casing comprising a cylindrical wall presenting an inner surface with a portion co-operating with the outer cylindrical reference surface, and a first plane end face that co-operates with the plane reference surface of the first end portion; and a functional unit comprising a secondary casing with an end portion also coming into abutment against the first plane end face of the main casing, and a functional member connected to the first end of the rotor and positioned relative to the inner cylindrical reference surface and to the plane reference surface of the rotor.

Advantageously, the rotary machine of the invention includes a main casing that includes an opening for entry of gaseous cooling fluid, the opening being situated facing one of the gaseous fluid entry openings situated in the first intermediate portion, an opening for exit of gaseous cooling fluid situated facing one of the gaseous fluid exit openings situated in the second intermediate portion, and a cooling liquid inlet and a cooling liquid outlet leading into the cooling liquid flow channels.

In a particular embodiment, in the rotary machine of the invention, the main casing further comprises a leaktight closing end wall situated outside the axial magnetic abutment.

In another particular embodiment, in the rotary machine of the invention, the main casing includes a cylindrical wall of thickness that defines an additional plane reference surface perpendicular to the longitudinal axis X-X' outside the axial magnetic abutment.

Under such circumstances, the rotary machine of the invention may include a second functional unit comprising a secondary casing with an end portion coming into abutment against the additional plane reference surface of the main casing, and a functional member connected to the second end of the rotor and positioned relative to a second inner cylindrical reference surface and to a second plane reference surface of the rotor situated beside the axial magnetic abutment.

The rotary machine of the invention may for example constitute a centrifugal compressor or a turbogenerator unit.

The invention also provides a method of manufacturing a rotary machine, the method being characterized in that it comprises the following steps:

i) manufacturing a modular motor and magnetic bearing assembly by assembling together:
  a) a positioning casing comprising a first end portion presenting a plane reference surface perpendicular to a longitudinal axis X-X', a second end portion forming the support of an axial magnetic abutment, a cylindrical wall presenting a first end having an outer cylindrical reference surface, a second end secured to the second end portion, a central portion provided on an outer face with channels for a flow of cooling liquid, a first intermediate portion provided with openings for entry of gaseous fluid, and a second intermediate portion provided with openings for exit of gaseous fluid;
  b) a rotor having the longitudinal axis X-X' as its axis and presenting a first end provided with an inner cylindrical reference surface and a plane reference surface perpendicular to the longitudinal axis X-X';
  c) an electric motor comprising a stator mounted on an inner face of the central portion of the cylindrical wall of the positioning casing and an armature mounted on an outer surface of the rotor;
  d) a first radial magnetic bearing comprising a stator mounted on an inner face of the first intermediate portion of the cylindrical wall of the positioning casing and an armature mounted on an outer surface of the rotor;
  e) a second radial magnetic bearing comprising a stator mounted on an inner face of the second intermediate portion of the cylindrical wall of the positioning casing and an armature mounted on an outer surface of the rotor;
  f) an axial abutment comprising a rotor armature mounted at the second end of the rotor perpendicularly to the longitudinal axis X-X' and two stator subassemblies mounted on the axial abutment support;
  g) a first auxiliary mechanical bearing arranged between the first end portion of the positioning casing and the first end of the rotor; and
  h) a second auxiliary mechanical bearing arranged between the second end portion of the positioning casing and the second end of the rotor;

ii) axially sliding the modular motor and magnetic bearing assembly into a main casing comprising a cylindrical wall having an inner surface, by causing a portion of the inner surface to co-operate with the outer cylindrical reference surface, and by causing a first plane end face of the main casing to co-operate with the plane reference surface of the first end portion; and iii) assembling a functional unit comprising a secondary casing and a functional member by causing an end portion of the secondary casing to come into abutment against the first plane end face of the main casing and by connecting the functional member to the first end of the rotor and by positioning it relative to the inner cylindrical reference surface and to the plane reference surface of the rotor.

In summary, the present invention relates essentially to a modular motor and magnetic bearing assembly that comprises a positioning casing having a plane reference surface, an outer cylindrical reference surface, a central portion provided on an outer face with cooling liquid flow channels, and intermediate portions having gaseous fluid entry and exit openings; a rotor presenting an inner cylindrical reference surface and a plane reference surface; an electric motor; radial magnetic bearings; an axial abutment; and auxiliary mechanical bearings.

The modular assembly can then be incorporated in a main casing merely by sliding and it can be connected directly to a functional unit without reworking the adjustment of the magnetic bearings.

In the invention, the modular motor and magnetic bearing assembly may be made in a factory by the manufacturer of the motor with all of its mechanical parameters being adjusted by using specialized tooling. Thereafter, the modular assembly can be incorporated in a main casing adapted to some particular application and a given functional unit can be connected thereto in situ without modifying basic parameters relating to the motor and to the magnetic bearings, by using a positioning casing that involves only a small number of mechanical interfaces (reference surfaces). Furthermore, when the cooling channels are formed in the positioning casing, and because of the presence of multiple openings in the intermediate portions of the positioning casing, it is also easier for the final user to implement a cooling system for the motor.

Thus, with a single modular motor and magnetic bearing assembly, the invention makes it possible to provide an entire range of different rotary machines such as centrifugal compressors, including pumps, ventilators, fans, and compressors, or more generally turbine machines including turbogenerator units.

BRIEF DESCRIPTION OF THE DRAWINGS

Other characteristics and advantages of the invention appear from the following description of particular embodiments given as non-limiting examples and with reference to the accompanying drawings, in which.

DETAILED DESCRIPTION OF PARTICULAR EMBODIMENTS

Figure 1:
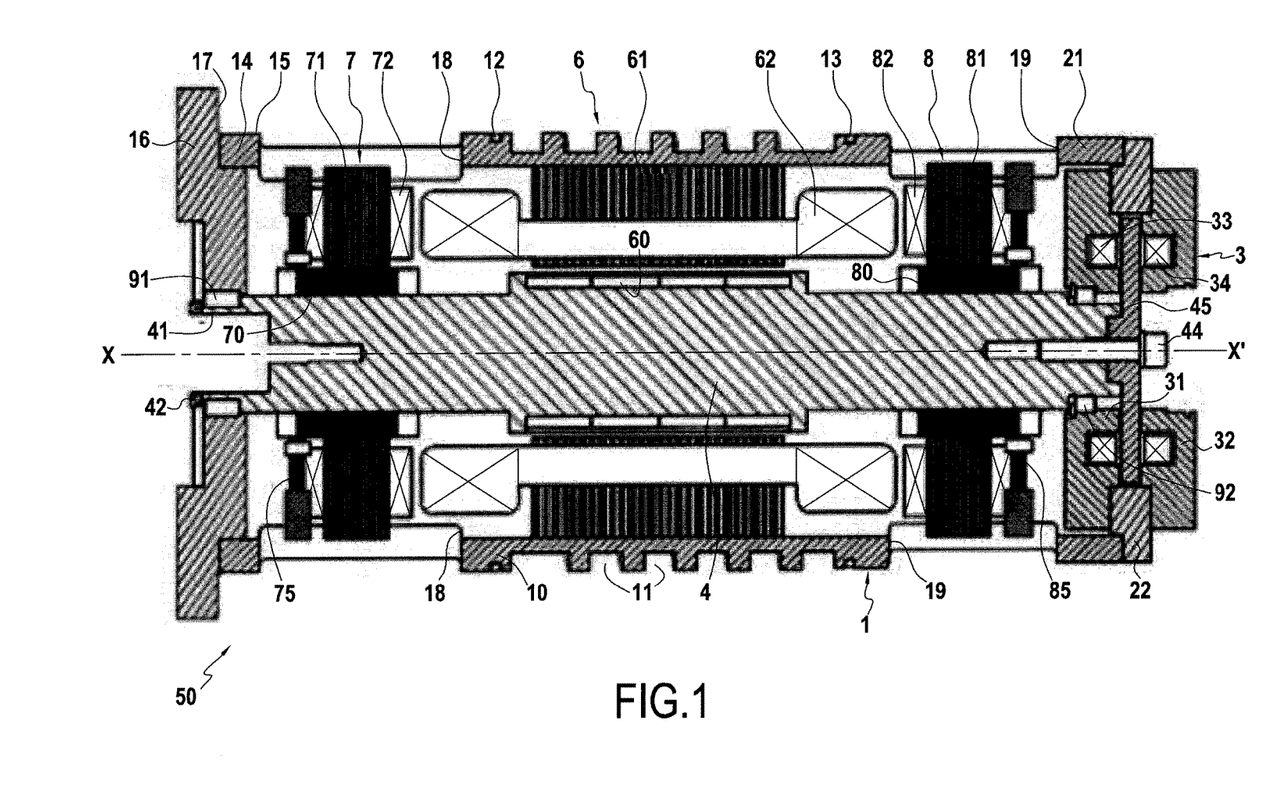
FIG. 1 is a diagrammatic axial section view of a modular motor and magnetic bearing assembly of the invention.

The description begins with reference to FIG. 1 showing an example of a modular motor and magnetic bearing assembly of the invention that includes all of the mechanical elements needed for enabling the electric motor 6 to drive rotation of a rotor 4, while maintaining the rotor in levitation without physical contact by means of radial magnetic bearings 7, 8 and of an axial magnetic bearing 3.

The modular assembly comprises a positioning casing 1 that makes it possible to adjust all of the physical parameters of the motor 6 and of the magnetic bearings 3, 7, and 8. The positioning casing 1 comprises a first end portion 16 having a plane reference surface 17 perpendicular to a longitudinal axis X-X', and a second end portion 22 forming the support for the axial magnetic bearing 3.

The positioning casing 1 also comprises a cylindrical wall 14 presenting a first end having an outer cylindrical reference surface 15, a second end secured to the second end portion 22, a central portion 10 provided on an outer face with cooling liquid flow channels 11, a first intermediate portion having openings 18 for entry of gaseous cooling fluid for cooling the motor 6 and the magnetic bearings 7, 8, and a second intermediate portion having openings 19 for exit of the gaseous cooling fluid. The central portion 10 of the cylindrical wall 14 of the positioning casing 1 further comprises gasket housings 12, 13 at first and second ends of its outer face with the cooling liquid flow channels 11 between them.

The rotor 4 having the longitudinal axis X-X' as its axis presents a first end having an inner cylindrical reference surface 41 and a plane reference surface 42 perpendicular to the longitudinal axis X-X'. At this first end, the rotor 4 also has a tapped thread for receiving a connection element of a functional member, such as an impeller as described below. At the other end of the rotor 4, a connection member such as a bolt 44 secures the rotor 4 to a rotor plane 45 of the axial abutment 3.

The electric motor 6 has an armature 60 mounted on an outer surface of the rotor 4 and a stator mounted on an inner face of the central portion of the cylindrical wall 14 of the positioning casing 1, the stator comprising a core 61 made up of a stack of ferromagnetic laminations, and a winding 62 associated with the core 61.

The radial magnetic bearings 7, 8 may be identical and they are arranged at opposite ends of the motor 6. Each of them has an annular armature 70, 80 made of ferromagnetic material mounted on an outer surface of the rotor 4 and stator electromagnets made up of yokes 71, 81 supporting windings 72, 82 and mounted on respective inner faces of the intermediate portions of the cylindrical wall 14 of the positioning casing 1.

The axial abutment 3 comprises the rotor armature 45 mounted at the second end of the rotor 4 perpendicularly to the longitudinal axis X-X' and two stator subassemblies 31, 33 and 32, 34 mounted on the axial abutment support 22 and situated on opposite sides of the rotor armature 45. Each stator of the axial abutment 3 comprises a yoke 31, 32 and windings 33, 34.

The modular assembly further comprises first and second position detectors 75, 85 for detecting the axial and radial positions of the rotor 4 relative to the positioning casing 1, which position detectors are arranged respectively in the vicinity of the first radial magnetic bearing 7 and in the vicinity of the second radial magnetic bearing 8, and may advantageously be of the inductive type.

A first auxiliary mechanical bearing 91, or emergency bearing, is arranged between the first end portion 16 of the positioning casing 1 and the first end of the rotor 4, and a second auxiliary mechanical bearing 92 is arranged between the second end portion 22 of the positioning casing 1 and the second end of the rotor 4. The auxiliary mechanical bearings 91 and 92 come into service only when the motor 6 is starting or stopping, or in the event of the magnetic bearings 7, 8 failing.

With reference to FIGS. 2 to 5, there follows a description of a method of fabricating a rotary machine using the motor and magnetic bearing assembly described with reference to FIG. 1.

The method of the invention for fabricating a rotary machine thus comprises a first step i) consisting in fabricating a modular motor and magnetic bearing assembly as shown in FIG. 1, by assembling:

a) a positioning casing 1 comprising a first end portion 16 presenting a plane reference surface 17 perpendicular to a longitudinal axis X-X', a second end portion 22 forming the support of an axial magnetic abutment 3, a cylindrical wall 14 presenting a first end having an outer cylindrical reference surface 15, a second end secured to the second end portion 22, a central portion 10 provided on an outer face with channels 11 for a flow of cooling liquid, a first intermediate portion provided with openings 18 for entry of gaseous cooling fluid, and a second intermediate portion provided with openings 19 for exit of gaseous cooling fluid;

b) a rotor 4 having the longitudinal axis X-X' as its axis and presenting a first end provided with an inner cylindrical reference surface 41 and a plane reference surface 42 perpendicular to the longitudinal axis X-X';

c) an electric motor 6 comprising a stator 61, 62 mounted on an inner face of the central portion of the cylindrical wall 14 of the positioning casing 1 and an armature 60 mounted on an outer surface of the rotor 4;

d) a first radial magnetic bearing 7 comprising a stator 71, 72 mounted on an inner face of the first intermediate portion of the cylindrical wall 14 of the positioning casing 1 and an armature 70 mounted on an outer surface of the rotor 4;

e) a second radial magnetic bearing 8 comprising a stator 81, 82 mounted on an inner face of the second intermediate portion of the cylindrical wall 14 of the positioning casing 1 and an armature 80 mounted on an outer surface of the rotor 4;

f) an axial abutment 3 comprising a rotor armature 45 mounted at the second end of the rotor 4 perpendicularly to the longitudinal axis X-X' and two stator subassemblies 31, 33; 32, 34 mounted on the axial abutment support 22;

g) a first auxiliary mechanical bearing 91 arranged between the first end portion 16 of the positioning casing 1 and the first end of the rotor 4; and h) a second auxiliary mechanical bearing 92 arranged between the second end portion 22 of the positioning casing 1 and the second end of the rotor 4.

Figure 2:
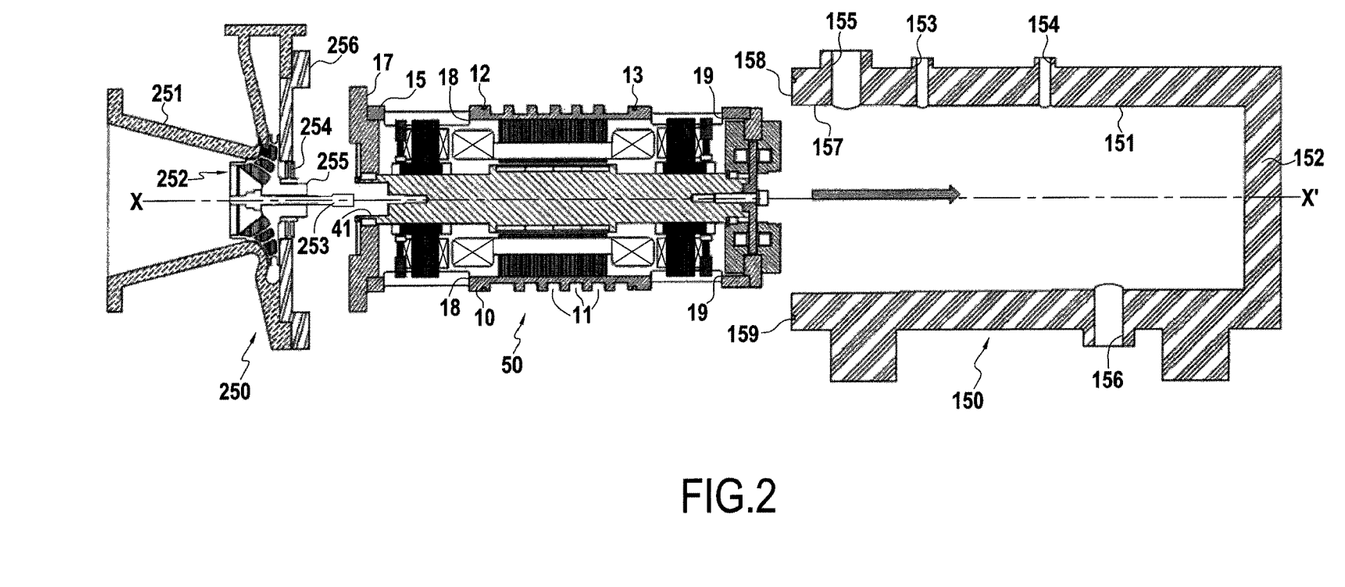
FIG. 2 is an exploded view showing the method of assembling the FIG. 1 modular assembly with a casing and a functional member such as a pump impeller.

The method of the invention for manufacturing a rotary machine, as shown in FIG. 2, comprises a step ii) consisting in axially sliding the modular motor and magnetic bearing assembly 50 into a main casing 150 having a cylindrical wall presenting an inner surface 151, causing a portion 157 of this inner surface to co-operate with the outer cylindrical reference surface 15, and causing a first plane end face 158 of the main casing 150 to co-operate with the plane reference surface 17 of the first end portion 16 of the positioning casing 1 of FIG. 1. The plane end face 158 may include a circular groove 159 centered on the axis X-X' for the purpose of receiving a gasket (see FIGS. 2 and 3).

The method of the invention for manufacturing a rotary machine, as shown in FIG. 2, finally comprises a step iii) consisting in assembling a functional unit 250 comprising a secondary casing 251, 256 and a functional member 252 by causing an end portion 256 of the secondary casing 251, 256 to come into abutment against the first plane end face 158 of the main casing 150 and by connecting the functional member 252, e.g. with the help of a screw 253 co-operating with the thread in the first end of the rotor 4, and while positioning a cylindrical surface 255 and a plane surface 254 of the functional member 252, such as a pump impeller, respectively relative to the inner cylindrical reference surface 41 and relative to the plane reference surface 42 of the rotor 4.

Figure 3:
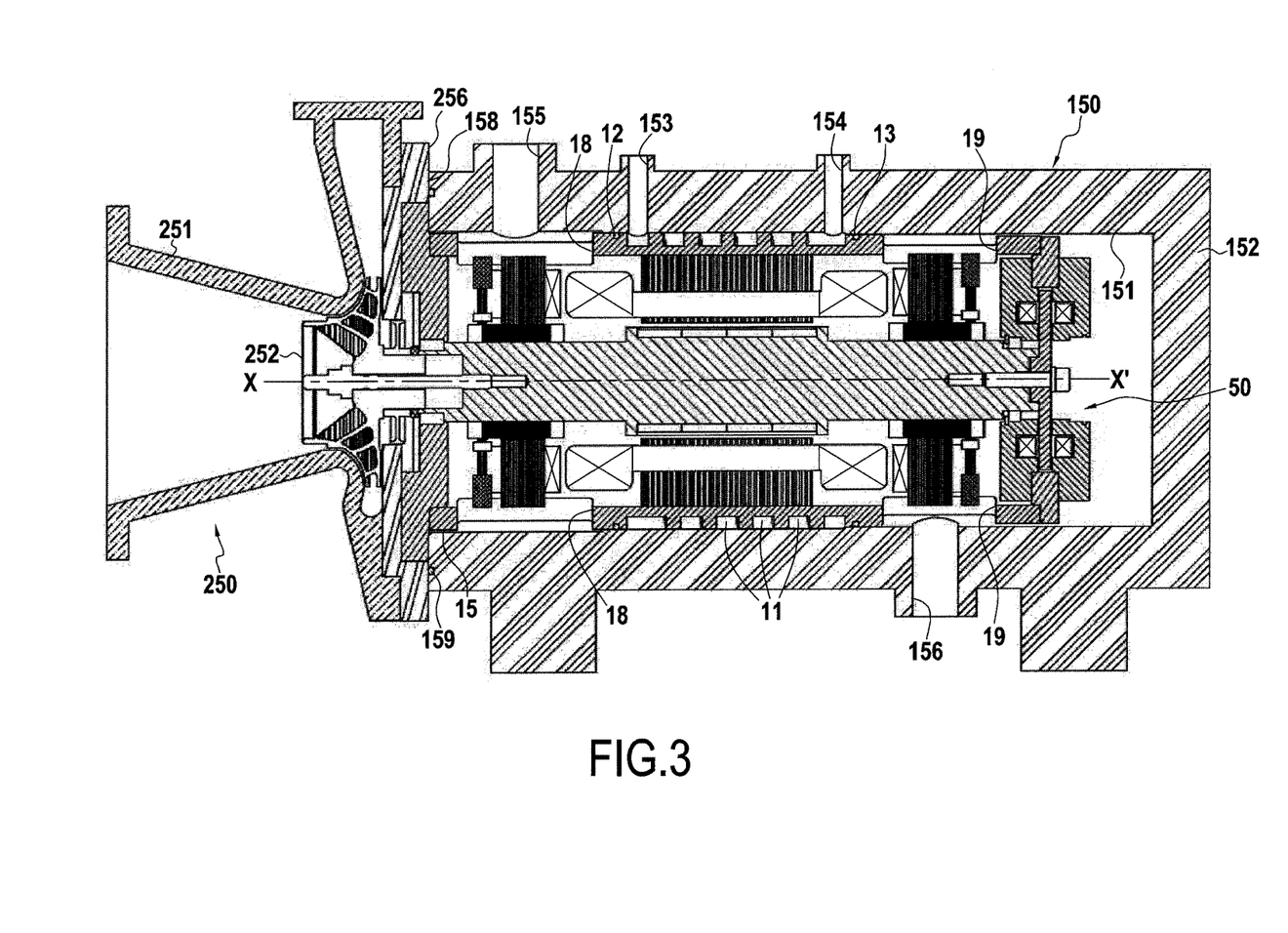
FIG. 3 is a diagrammatic axial section view showing the final machine obtained after assembling together the various elements shown in exploded manner in FIG. 2.

As can be seen in FIGS. 2 and 3, the main casing 150 includes an opening 155 for entry of gaseous cooling fluid, which opening faces one of the openings 18 for entry of gaseous fluid situated in the first intermediate portion of the positioning casing 1, an opening 156 for exit of gaseous cooling fluid situated facing one of the openings 19 for exit of gaseous fluid situated in the second intermediate portion of the positioning casing 1, and a cooling liquid inlet 153 and a cooling liquid outlet 154 leading to the cooling liquid channels 11 of the central portion 10 of the positioning casing 1.

In the embodiment of FIGS. 2 and 3, the main casing 150 further comprises a leaktight closing end wall 152 situated outside the axial magnetic abutment 3.

FIG. 3 shows a rotary machine that results from a modular motor and magnetic bearing assembly 50 being assembled in accordance with the invention with a main casing 150 and with a functional unit 250.

The invention thus makes it possible to adapt to main casings 150 made of a variety of materials and presenting various shapes and thicknesses providing the inner surface 151, and in particular the cylindrical positioning surface 157, and also the plane end surface 158, match the reference surfaces 15, 17 of the modular assembly 50. The conditions relating to the interfaces are thus reduced, and all of the conditions relating to positioning the magnetic bearings 7, 8, the axial abutment 3, the sensors 75, 85, and the motor 6 are predefined in the modular assembly 50 relative to the positioning casing 1, such that no additional adjustment is needed when assembling the modular assembly 50 with the main casing 150 and the functional unit 250, in particular relating to the axial and radial position detectors 75, 85.

Furthermore, concerning the cooling circuits for the motor 6 and for the magnetic bearings 7, 8, the adaptations that need to be performed when incorporating the modular assembly 50 in a particular rotary machine are very small, since the liquid cooling circuit is already embodied by the channels 11 in the central portion 10 of the positioning casing, and it suffices to provide an inlet 153 and an outlet 154 for the cooling liquid in the wall of the main casing 150, without any need to perform other complicated machining operations. In the same manner, because of the existence of multiple openings 18, 19 in the intermediate portions of the positioning casing 1, it is easy to position the cooling gas entry orifice 155 and the cooling gas exit orifice 156 relative to a respective opening 18, 19 of the positioning casing 1.

The present invention may present various embodiments and may be adapted to systems that are open or hermetically sealed, and to systems having one functional unit or two.

By way of example, in a variant, it should be observed that the groove 159 and the corresponding gasket, which are arranged in the end face 158 of the main casing 150 in FIGS. 2 and 3, could be provided in equivalent manner in the end portion 256 of the secondary casing 251, 256 of the functional unit 250.

Figure 4:
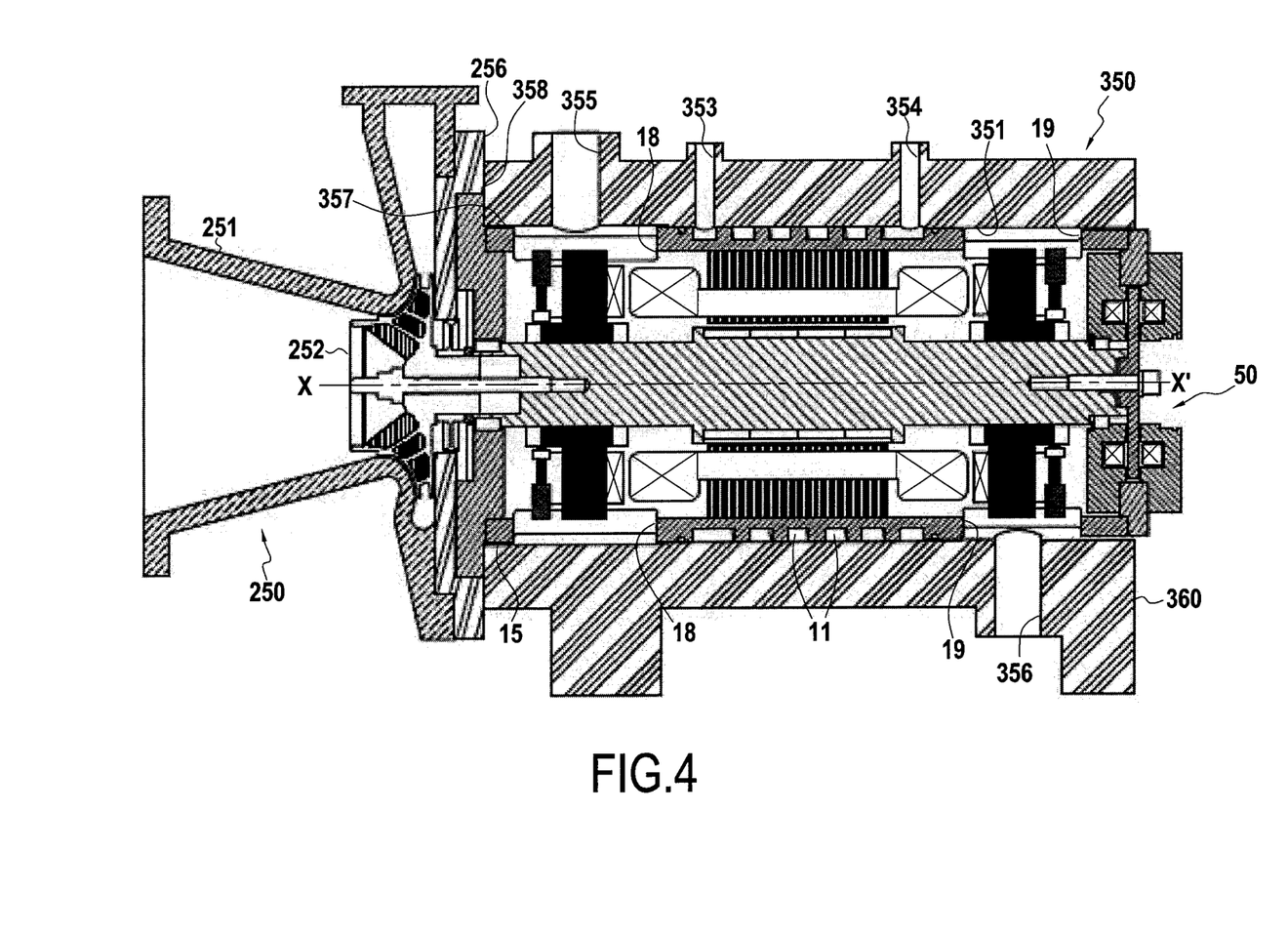
FIG. 4 is a diagrammatic axial section view showing how the FIG. 1 modular assembly is incorporated in an assembly that is open, i.e. that is not hermetically sealed.

FIG. 4 shows an example of a rotary machine in which the main casing 350 has a cylindrical wall of thickness that defines an additional plane reference surface 360 perpendicular to the longitudinal axis X-X' outside the axial magnetic abutment 3. Under such circumstances, the main casing 350 is open and does not include the end face 152 of the main casing 150 of FIGS. 2 and 3. Otherwise, in the embodiment of FIG. 4, the references 351 and 353 to 358 correspond respectively to the references 151 and 153 to 158 of the main casing 150 shown in FIGS. 2 and 3, and the corresponding elements are not described again.

Figure 5:
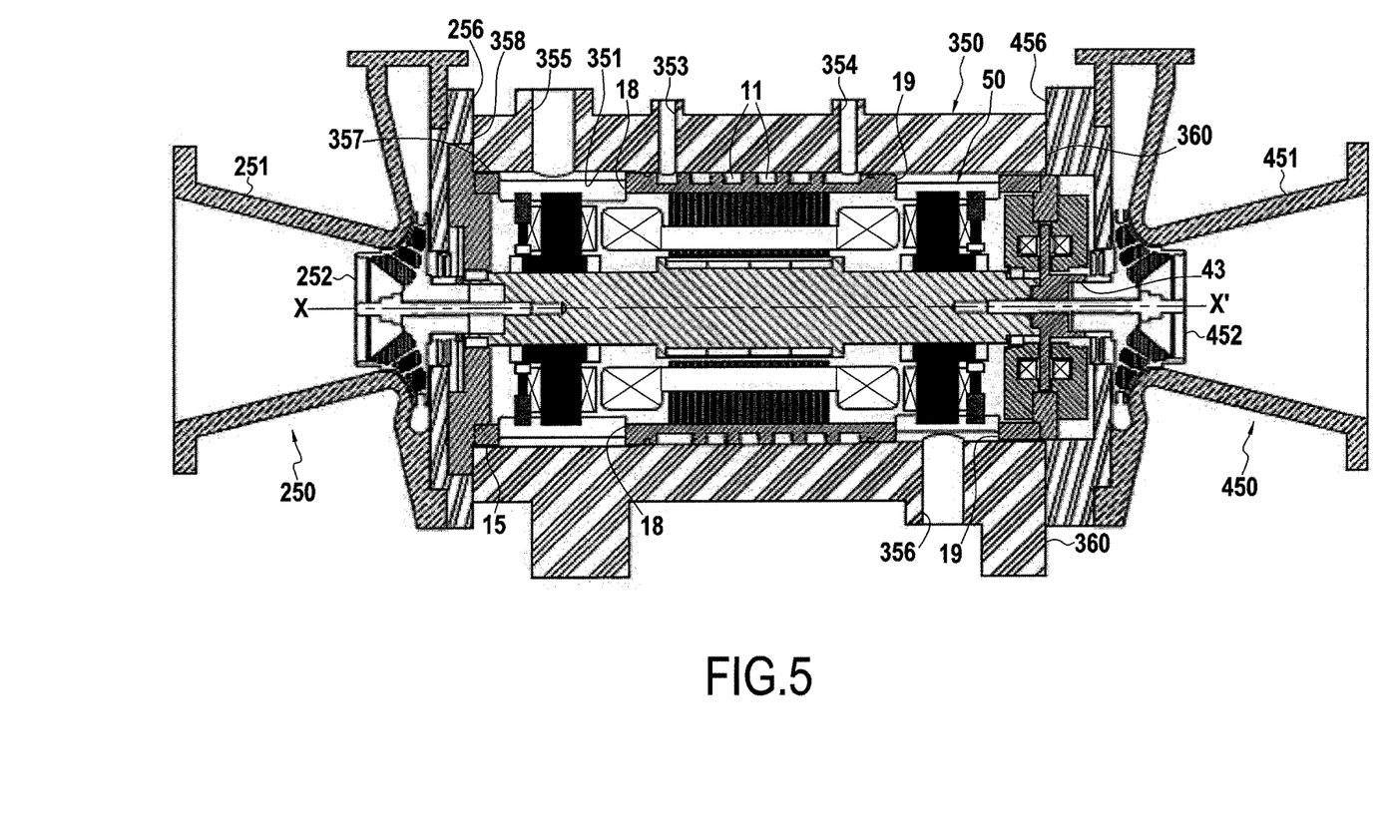
FIG. 5 is a diagrammatic axial section view showing how the FIG. 1 modular assembly is incorporated in a machine having two impellers.

FIG. 5 shows an example of a rotary machine comprising a modular motor and magnetic bearing assembly 50 of the kind shown in FIG. 1 in association with a first functional unit 250 such as that described with reference to FIGS. 2 and 3, and with a second functional unit 450, which may be similar to the functional unit 250, having elements 451, 452, and 456 that correspond respectively to the elements 251, 252, and 256 of the functional unit 250 of FIGS. 2 to 5. In the embodiment of FIG. 5, which has two impellers 252 and 452 forming parts of the functional units 250 and 450 that are connected to the two ends of the modular assembly 50, the rotor armature support of the axial abutment of the modular assembly 50 presents a cylindrical reference surface 43 co-operating with the movable member 452 secured to the rotor 4. This cylindrical reference surface 43 performs the same role as the cylindrical reference surface 41 (FIG. 1) for co-operating with the cylindrical surface 255 of the movable member 252 (FIG. 2). The rotor armature support of the axial abutment of the FIG. 5 modular assembly 50 may also present a plane end reference surface analogous to the plane reference surface 42 (FIG. 1) for co-operating with an end surface 254 of the movable member 252 (FIG. 2).

In summary, in the embodiment of FIG. 5, the final rotary machine includes a second functional unit 450 comprising a secondary casing 451, 456 with an end portion 456 that comes into abutment against the additional plane reference surface 360 of the main casing 350, and a functional member 452 connected to the second end of the rotor 4 and positioned relative to a second inner cylindrical reference surface 43 and to a second plane reference surface of the rotor 4 situated beside the axial magnetic abutment.

The invention claimed is:

1. A modular motor and magnetic bearing assembly comprising:
    a positioning casing comprising a first end portion presenting a plane reference surface perpendicular to a longitudinal axis X-X', a second end portion forming the support of an axial magnetic abutment, a cylindrical wall presenting a first end having an outer cylindrical reference surface, a second end secured to the second end portion, a central portion provided on an outer face with channels for a flow of cooling liquid, a first intermediate portion provided with openings for entry of gaseous fluid, and a second intermediate portion provided with openings for exit of gaseous fluid;
    a rotor having the longitudinal axis X-X' as its axis and presenting a first end provided with an inner cylindrical reference surface and a plane reference surface perpendicular to the longitudinal axis X-X';
    an electric motor comprising a stator mounted on an inner face of the central portion of the cylindrical wall of the positioning casing and an armature mounted on an outer surface of the rotor;
    a first radial magnetic bearing comprising a stator mounted on an inner face of the first intermediate portion of the cylindrical wall of the positioning casing and an armature mounted on an outer surface of the rotor;

a second radial magnetic bearing comprising a stator mounted on an inner face of the second intermediate portion of the cylindrical wall of the positioning casing and an armature mounted on an outer surface of the rotor;

an axial abutment comprising a rotor armature mounted at the second end of the rotor perpendicularly to the longitudinal axis X-X' and two stator subassemblies mounted on the axial abutment support;

a first auxiliary mechanical bearing arranged between the first end portion of the positioning casing and the first end of the rotor; and a second auxiliary mechanical bearing arranged between the second end portion of the positioning casing and the second end of the rotor, wherein the plane reference surface and the outer cylindrical reference surface are matched to a main casing of a rotary machine based on relative positioning to reduce manufacturing adjustments.

2. The modular assembly according to claim 1, further comprising first and second position detectors for detecting the axial and radial positions of the rotor relative to the positioning casing, which position detectors are arranged respectively in the vicinity of the first radial magnetic bearing and in the vicinity of the second radial magnetic bearing.

3. The modular assembly according to claim 1, wherein the central portion of the cylindrical wall of the positioning casing further comprises gasket housings at first and second ends of its outer face with the cooling liquid flow channels between them.

4. A rotary machine, comprising:
a modular motor and magnetic bearing assembly including:
a positioning casing comprising a first end portion presenting a plane reference surface perpendicular to a longitudinal axis X-X', a second end portion forming the support of an axial magnetic abutment, a cylindrical wall presenting a first end having an outer cylindrical reference surface, a second end secured to the second end portion, a central portion provided on an outer face with channels for a flow of cooling liquid, a first intermediate portion provided with openings for entry of gaseous fluid, and a second intermediate portion provided with openings for exit of gaseous fluid,
a rotor having the longitudinal axis X-X' as its axis and presenting a first end provided with an inner cylindrical reference surface and a plane reference surface perpendicular to the longitudinal axis X-X',
an electric motor comprising a stator mounted on an inner face of the central portion of the cylindrical wall of the positioning casing and an armature mounted on an outer surface of the rotor,
a first radial magnetic bearing comprising a stator mounted on an inner face of the first intermediate portion of the cylindrical wall of the positioning casing and an armature mounted on an outer surface of the rotor,
a second radial magnetic bearing comprising a stator mounted on an inner face of the second intermediate portion of the cylindrical wall of the positioning casing and an armature mounted on an outer surface of the rotor,
an axial abutment comprising a rotor armature mounted at the second end of the rotor perpendicularly to the longitudinal axis X-X' and two stator subassemblies mounted on the axial abutment support,
a first auxiliary mechanical bearing arranged between the first end portion of the positioning casing and the first end of the rotor, and
a second auxiliary mechanical bearing arranged between the second end portion of the positioning casing and the second end of the rotor;
a main casing comprising a cylindrical wall presenting an inner surface with a portion co-operating with the outer cylindrical reference surface, and a first plane end face that co-operates with the plane reference surface of the first end portion; and
a functional unit comprising a secondary casing with an end portion also coming into abutment against the first plane end face of the main casing, and a functional member connected to the first end of the rotor and positioned relative to the inner cylindrical reference surface and to the plane reference surface of the rotor,
wherein the plane reference surface and the outer cylindrical reference surface are matched to the main casing of the rotary machine based on relative positioning to reduce manufacturing adjustments.

5. A rotary machine according to claim 4, wherein the main casing includes:
an opening for entry of gaseous cooling fluid, the opening being situated facing one of the gaseous fluid entry openings situated in the first intermediate portion,
an opening for exit of gaseous cooling fluid situated facing one of the gaseous fluid exit openings situated in the second intermediate portion, and
a cooling liquid inlet and a cooling liquid outlet leading into the cooling liquid flow channels.

6. A rotary machine according to claim 4, the main casing further comprising a leaktight closing end wall situated outside the axial magnetic abutment.

7. A rotary machine according to claim 4, the main casing further comprising a cylindrical wall having a thickness that defines an additional plane reference surface perpendicular to the longitudinal axis X-X' outside the axial magnetic abutment.

8. A rotary machine according to claim 7, further comprising a second functional unit including:
a secondary casing with an end portion coming into abutment against the additional plane reference surface of the main casing, and
a functional member connected to the second end of the rotor and positioned relative to a second inner cylindrical reference surface and to a second plane reference surface of the rotor situated beside the axial magnetic abutment.

9. A rotary machine according to claim 4, wherein the rotary machine constitutes one of a centrifugal compressor or a turbogenerator unit.

* * * * *